US012599970B2

(12) United States Patent
Kampffmeyer et al.

(10) Patent No.: US 12,599,970 B2
(45) Date of Patent: Apr. 14, 2026

(54) DEVICE AND METHOD FOR ADDITIVE MANUFACTURING UNDER PROTECTIVE GAS

(71) Applicant: Messer SE & Co. KGaA, Bad Soden (DE)

(72) Inventors: Dirk Kampffmeyer, Linnich (DE); Bernd Hildebrandt, Tönisvorst (DE)

(73) Assignee: MESSER SE & CO. KGAA, Bad Soden (DE)

( * ) Notice: Subject to any disclaimer, the term of this patent is extended or adjusted under 35 U.S.C. 154(b) by 496 days.

(21) Appl. No.: 18/002,317

(22) PCT Filed: Jun. 2, 2021

(86) PCT No.: PCT/EP2021/064850
§ 371 (c)(1),
(2) Date: Dec. 19, 2022

(87) PCT Pub. No.: WO2022/002523
PCT Pub. Date: Jan. 6, 2022

(65) Prior Publication Data
US 2023/0241686 A1      Aug. 3, 2023

(30) Foreign Application Priority Data

Jun. 29, 2020     (DE) ..................... 10 2020 003 888.3

(51) Int. Cl.
*B22F 12/70* (2021.01)
*B22F 10/28* (2021.01)
(Continued)

(52) U.S. Cl.
CPC ............ *B22F 12/70* (2021.01); *B29C 64/371* (2017.08); *B33Y 30/00* (2014.12); *B22F 10/28* (2021.01); *B29C 64/153* (2017.08); *B33Y 10/00* (2014.12)

(58) Field of Classification Search
CPC .......... B22F 12/70; B22F 10/28; B33Y 30/00; B33Y 10/00; B29C 64/371; B29C 64/153
See application file for complete search history.

(56) References Cited

U.S. PATENT DOCUMENTS 10,144,176 B1 * 12/2018 Buller ..................... B22F 10/36
2018/0065209 A1     3/2018 Foret
(Continued)

FOREIGN PATENT DOCUMENTS

DE      102016201812 A1      8/2017
DE      102017110649 A1      11/2018
(Continued)

OTHER PUBLICATIONS

WO1989005209A1 english (Year: 1989).*
(Continued)

*Primary Examiner* — Ricardo D Morales
(74) *Attorney, Agent, or Firm* — Andrus Intellectual Property Law, LLP

(57)      ABSTRACT

The invention relates to a device for the additive manufacturing of workpieces under protective gas, which device is provided with a manufacturing chamber designed as a pressure chamber, said manufacturing chamber being fluidically connected to a pressure container via a gas extraction line, which is provided with a vacuum pump, and via a gas return line. After the manufacturing of a first workpiece, the protective gas present in the manufacturing chamber is evacuated, temporarily stored in the pressure container and, prior to the manufacturing of a second workpiece, is introduced into the manufacturing chamber.

14 Claims, 1 Drawing Sheet

(51) Int. Cl.
    *B29C 64/153*          (2017.01)
    *B29C 64/371*          (2017.01)
    *B33Y 10/00*           (2015.01)
    *B33Y 30/00*           (2015.01)

(56)          References Cited

U.S. PATENT DOCUMENTS

| | | | |
|---|---|---|---|
| 2019/0001413 A1 | 1/2019 | Golz et al. | |
| 2019/0143410 A1* | 5/2019 | Kawada | B22F 10/28 |
| | | | 425/78 |

FOREIGN PATENT DOCUMENTS

| | | | |
|---|---|---|---|
| DE | 102018127598 A1 | 5/2019 | |
| DE | 102018206322 A1 | 10/2019 | |
| EP | 3006139 A1 | 4/2016 | |
| EP | 3277452 B1 | 1/2019 | |
| EP | 3628420 A1 | 4/2020 | |
| WO | WO1989005209 A1 * | 6/1989 | .......... B23K 26/244 |
| WO | 2019001900 A1 | 1/2019 | |

OTHER PUBLICATIONS

International Search Report and Written Opinion in PCT/EP2021/064850, dated Sep. 1, 2021, 6 pages.

Messer SE & Co. KGAA, "Method and Apparatus for Additive Manufacturing Under Protective Gas," U.S. Appl. No. 18/000,754, filed Dec. 5, 2022 (specification, claims, and drawings only).

Hildebrandt, Bernd et al., "Method and Apparatus for Additive Manufacturing Under Protective Gas", U.S. Appl. No. 18/000,754, filed Dec. 5, 2022 (specification, claims and drawings only).

Bockler, Thomas et al., "Method for Finishing a Workpiece Made by Additive Manufacturing", U.S. Appl. No. 17/291,137, filed May 4, 2021 (specification, claims and drawings only).

* cited by examiner

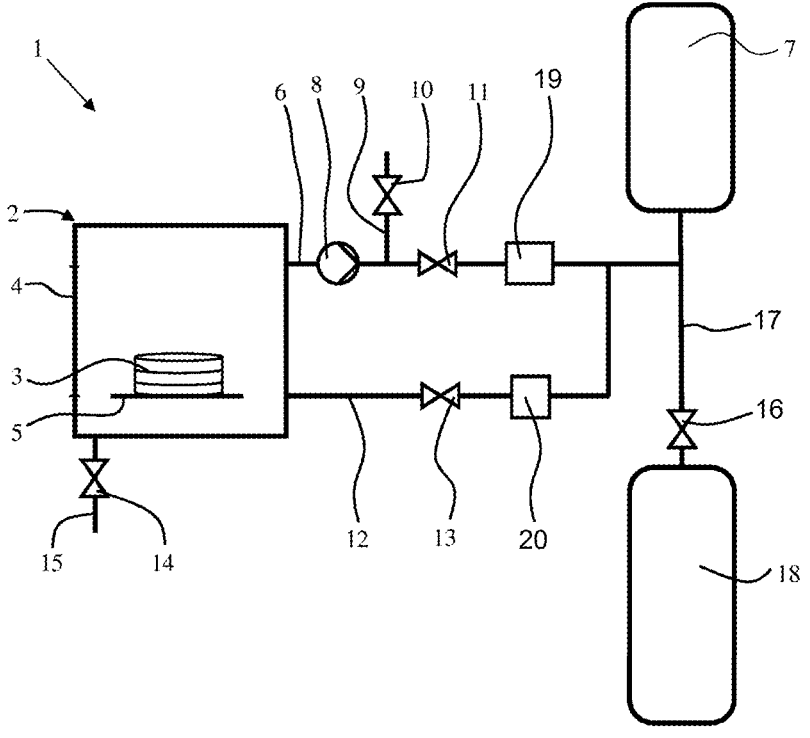

DEVICE AND METHOD FOR ADDITIVE MANUFACTURING UNDER PROTECTIVE GAS

CROSS-REFERENCE TO RELATED APPLICATIONS

The present application is the U.S. national stage application of international application PCT/EP2021/064850 filed Jun. 2, 2021, which international application was published on Jan. 6, 2022, as International Publication WO 2022/002523 A1. The international application claims priority to German Patent Application No. 10 2020 003 888.3 filed Jun. 29, 2020.

FIELD

The invention relates to an apparatus for additive manufacturing of workpieces under protective gas comprising a manufacturing chamber in which a workpiece is producible under protective gas by selective sintering or melting of a pulverulent starting material through introduction of energy. The invention further relates to a corresponding process.

BACKGROUND

A growing trend in modern production is that of additive manufacturing processes. These are presently to be understood as generally meaning manufacturing processes where a three-dimensional workpiece is produced layerwise from a material made of metal or plastic by the action of energy.

In powder-based additive manufacturing processes a pulverulent material is applied to a work area in a thin layer. Using an energy beam, in particular a laser beam or an electron beam, the material is molten or sintered with pinpoint accuracy according to a computer-aided model. The molten/sintered material forms a solid contour (also referred to here as a "workpiece contour") upon resolidification, which is joined to contours produced previously and/or subsequently in the same manner to afford a workpiece. This makes it possible to construct especially shaped articles having an in some cases highly complex three-dimensional structure. Powder-based additive manufacturing processes include for example electron beam melting (EBM), selective laser beam melting (SLM) or selective laser sintering (SLS).

To protect the workpiece and the material from adverse effects of the ambient atmosphere, powder-based additive manufacturing processes are usually performed under vacuum or under protective gas in the case of both metallic and plastic materials. In the latter case manufacturing is carried out in a gastight chamber, referred to here as the "manufacturing chamber" and often also as the "build space", which is flooded with protective gas before and/or during manufacturing.

For example, EP 3 628 420 A1 describes a process for additive manufacturing where various mixtures of argon and helium are used as protective gases.

EP 3 006 139 A1 proposes a process for layerwise production of a metallic workpiece by additive manufacturing where layers of a pulverulent metal material are consecutively provided and subjected to a laser beam, wherein a process gas is supplied in each case. The process gas is used to specifically influence the chemical or physical properties of the molten material of every layer. Various argon- and helium-containing process gases are used for example. One process gas, which contains not only an inert gas but also hydrogen in an amount between 0.01% by volume and 50% by volume, protects the metal melt during laser treatment by binding oxygen present in the metal powder.

EP 3 277 452 B1 proposes in a process for additive manufacturing under protective gas regularly withdrawing a portion of the gas atmosphere from the manufacturing chamber as a gas stream. One or more parameters of the withdrawn gas stream are determined and in each case compared with a threshold value. If a certain divergence is exceeded the gas is discarded and replaced or supplemented by freshly supplied gas.

DE 10 2018 206 322 A1 describes a plant and a process for additive manufacturing where the contours of the workpiece to be produced are subjected to a directed protective gas stream during manufacturing. The preferably oxygen-free protective gas is continuously extracted from the manufacturing chamber and, after filtering, returned to the manufacturing chamber.

To remove the printed workpiece the manufacturing chamber is opened, thus causing the protective gas present therein to escape. Before manufacture of the next workpiece the manufacturing chamber must therefore be prepared, thus requiring removal of ingressed ambient air and replacement of the protective gas atmosphere. This procedure is associated with a considerable cost in terms of time and effort as well as a not inconsiderable loss of protective gas.

SUMMARY

It is accordingly an object of the invention in a sequential production of workpieces by additive manufacturing under protective gas in a manufacturing chamber to reduce losses of protective gas and to be able to rapidly replace the protective gas atmosphere in the manufacturing chamber before manufacture of the next workpiece.

Thus, according to the invention an apparatus for additive manufacturing of workpieces under protective gas which is provided with a manufacturing chamber in which a workpiece is producible under protective gas by selective sintering or melting of a pulverulent starting material through introduction of energy is characterized in that the manufacturing chamber is in the form of a pressure chamber and is fluidically connected to a pressure vessel via a gas withdrawal conduit fitted with a vacuum pump and via a gas return conduit.

The apparatus according to the invention makes it possible for the protective gas present in the manufacturing chamber after production of a first workpiece to be at least largely removed by evacuation using the vacuum pump, withdrawn via the gas withdrawal conduit and intermediately stored in the pressure vessel. The vacuum pump is suitable therefor and specified for reducing the pressure in the manufacturing chamber to a predetermined value of for example below 10 hPa, preferably below 1 hPa. Supplying the pumped-out atmosphere increases the pressure in the pressure vessel, for example to a value between 1 and 10 bar(g), preferably between 2 and 5 bar(g). The manufacturing chamber is subsequently flooded with a purge gas, for example ambient air or an inert gas, via a purge gas feed conduit and the workpiece may be removed.

Before commencing manufacturing of a subsequent workpiece the residual atmosphere present in the manufacturing chamber is evacuated via an evacuation conduit, wherein this may be effected using the same or a different vacuum pump to that used to fill the pressure vessel. The evacuated residual atmosphere consisting at least largely of purge gas is released to the ambient atmosphere or sent for another use.

The protective gas intermediately stored in the pressure vessel is subsequently supplied to the evacuated manufacturing chamber via the gas return conduit and very rapidly reforms a protective gas atmosphere therein. The positive pressure in the pressure vessel obviates the need to use a pump when returning the protective gas to the manufacturing chamber; however such a pump in the gas return conduit is not ruled out in the context of the invention.

The evacuation conduit used for evacuating the residual atmosphere from the manufacturing chamber is for example a separate conduit provided with a dedicated vacuum pump which opens directly into the manufacturing chamber. However, in a preferred embodiment the evacuation conduit is a branch conduit leading away from the gas withdrawal conduit downstream of the vacuum pump used for evacuating the protective gas, so that the same vacuum pump may be used both for evacuation of the protective gas and for removal of the residual atmosphere.

The manufacturing chamber may be used to perform all known processes for additive manufacturing of workpieces made of plastic or metal under protective gas, in particular electron beam melting (EBM), selective laser beam melting (SLM) or selective laser sintering (SLS). Accordingly, the means required therefor are present in the manufacturing chamber, such as in particular a build platform, a means for supplying the pulverulent material and an irradiation unit for selectively irradiating and/or selectively melting the material. Employed protective gases are for example argon, helium, nitrogen, carbon dioxide or a mixture of two or more of these gases.

For removal of particulate impurities, for example dust, char or soot it is advantageous when a filter apparatus for particulate filtration is arranged in the gas withdrawal conduit and/or in the gas return conduit.

In order to remove in particular undesired gaseous impurities, such as oxygen or hydrogen, from the protective gas it is particularly advantageous when a means for gas purification is arranged in the gas return conduit and/or in the gas withdrawal conduit. Such a means may comprise for example an absorptive purification stage in which undesired constituents from the protective gas stream are absorbed on suitable absorption materials, for example silica gel, chromium salts, activated carbon or molecular sieves. The means for gas treatment comprises for example an Oxysorb® gas aftertreatment system for removal of oxygen from the gas stream.

An advantageous embodiment of the inventive apparatus is characterized in that the manufacturing chamber is provided with a gas flow means for continuously passing a protective gas stream through the manufacturing chamber during manufacturing. This embodiment allows the workpiece contours/the workpiece to be continuously subjected to protective gas and purification of the protective gas during the manufacturing process. Such a gas flow means comprising a gas feed, a gas discharge, a recirculation pump and optionally a filter apparatus may be provided on the manufacturing chamber as a separate assembly; alternatively or in addition a recirculation of the protective gas may be continuously effected during the ongoing manufacturing process via the gas withdrawal conduit and the gas return conduit since during the manufacturing process these are not required for the intermediate storage of protective gas and can thus function as a gas flow means. If the gas withdrawal conduit and/or the gas return conduit are provided with filtration or purification means this also allows purification of the protective gas during the ongoing manufacturing process.

To compensate protective gas losses and/or be able to replace contaminated protective gas, the pressure vessel is advantageously fluidically connected with a source of the protective gas required in the manufacturing chamber. This is for example a tank, a compressed gas bottle or a compressed gas bottle bundle, or else a mixing means in which the desired protective gas mixture is locally produced.

A process for additive manufacturing of workpieces under protective gas where protective gas is supplied to a manufacturing chamber and a workpiece is produced in the manufacturing chamber by selective sintering or melting of a pulverulent starting material through introduction of energy is, according to the invention, characterized in that after production of a first workpiece the protective gas present in the manufacturing chamber is evacuated using a vacuum pump and intermediately stored in a pressure vessel, the manufacturing chamber is subsequently flooded with a purge gas and the first workpiece is removed from the manufacturing chamber, before commencement of manufacturing of a second workpiece the residual atmosphere present in the manufacturing chamber consisting predominantly of purge gas is evacuated using the same or a different vacuum pump and subsequently the manufacturing chamber is flooded with protective gas from the pressure vessel.

According to the invention a sequential manufacturing of workpieces is carried out in a manufacturing chamber under protective gas. After each manufacturing of a workpiece the protective gas the protective gas is at least largely removed from the manufacturing chamber by evacuation thereof, intermediately stored in the pressure vessel and subsequently reused for producing a protective gas atmosphere in the manufacturing chamber. This allows the protective gas to be used for a plurality of manufacturing processes performed consecutively in the manufacturing chamber.

In order to be able to produce the purest possible protective gas atmosphere in the manufacturing chamber in the manufacture of a subsequent workpiece it is necessary to evacuate the residual atmosphere present in the manufacturing chamber after removal of the preceding workpiece before the protective gas from the pressure vessel can be resupplied. According to the invention this is effected via an evacuation conduit specified therefor using the same or a further vacuum pump. The pressure reduction in the manufacturing chamber produced using the vacuum pump (or the respective vacuum pumps) in the course of an evacuation depends in particular on the purity requirements for the protective gas. The pressure in the manufacturing chamber is preferably brought to a value of below 10 hPa, preferably of below 1 hPa during evacuation of the protective gas and/or during evacuation of the residual atmosphere.

The protective gas is advantageously supplied to a purification step during removal from the manufacturing chamber and/or during supply to the manufacturing chamber. This is for example a particulate filter arranged in the gas withdrawal conduit and/or in the gas return conduit or an apparatus for adsorptive gas purification which is likewise arranged in the gas withdrawal conduit and/or in the gas return conduit.

BRIEF DESCRIPTION OF THE DRAWING

An exemplary embodiment of the invention shall now be more particularly elucidated with reference to the drawing.

The sole drawing (FIG. 1) shows a schematic diagram of an apparatus according to the invention.

DETAILED DESCRIPTION

The apparatus 1 shown in FIG. 1 comprise a manufacturing chamber 2 in which a workpiece 3 is produced by additive manufacturing. The manufacturing chamber 2 is in the form of a gastight pressure chamber having a door 4 for removing the workpiece 3 and allows production of the workpiece 3 under protective gas. The production of the workpiece 3 in the manufacturing chamber 2 is effected in a manner known per se for example using a powder-based additive manufacturing process, for instance electron beam melting (EBM), selective laser melting (SLM) or selective laser sintering (SLS). A layer of a pulverulent material made of plastic or metal is fully or partially melted using an energy beam on a manufacturing platform 5. The molten material forms a solid contour upon resolidification which is joined to contours produced previously and/or subsequently in the same manner to afford the workpiece 3. During the manufacturing process the manufacturing chamber is filled with a protective gas, for example argon, helium, nitrogen, carbon dioxide or a mixture of two or more of these gases.

The manufacturing chamber 2 is fluidically connected to a pressure vessel 7 via a gas withdrawal conduit 6. Arranged in the gas withdrawal conduit 6 is a vacuum pump 8, by means of which the atmosphere present in the manufacturing chamber 2 may be very largely pumped out in the direction of the pressure vessel 7. The vacuum pump 8 is for example a membrane or rotary vane pump which allows evacuation of the manufacturing chamber 2 to a pressure of for example below 1 hPa. An evacuation conduit 9 further branches off from the gas withdrawal conduit 6 downstream of the vacuum pump 8. A valve 10 in the evacuation conduit 9 and a valve 11 in the gas withdrawal conduit 6 downstream of the branch of the evacuation conduit 9 allow the respective flow path to be closed.

The pressure vessel 7 and the manufacturing chamber 2 are additionally fluidically connected to one another via a gas return conduit 12 which is provided with a valve 13 for closing the gas return conduit 12. In the working example the gas return conduit 12 branches off from the gas withdrawal conduit 6 downstream of the vacuum pump 8 and opens into the manufacturing chamber 2 separately from the gas withdrawal conduit 6. Alternatively possible is a configuration in which the gas return conduit 12 opens directly both into the pressure vessel 7 and into the manufacturing chamber 2 in each case separately from the gas withdrawal conduit 6. It is likewise conceivable to configure the gas return conduit 7 as a bypass conduit which bypasses the vacuum pump 8 and opens into the gas withdrawal conduit 6 upstream and downstream of said pump. However, these alternative embodiments are not shown here.

A purge gas conduit 15 closable with a valve 14 also opens into the manufacturing chamber 2. Furthermore, the pressure vessel 7 is connected to a source 18 for protective gas, for example a compressed gas bottle, a compressed gas bundle or a tank, via a gas feed conduit 17 closable with a valve 16. The source 18 stores the protective gas required for the manufacturing process in the manufacturing chamber 2 in pure form and under pressure.

Valves 10, 11, 13, 14 and 16 are preferably motorized and may be operated using a control unit not shown here.

In the operation of the apparatus 1 the pressure vessel 7 is initially filled with protective gas at a pressure of for example 2-5 bar(g). Valves 10, 11, 13, 14 and 16 are closed and the materials required for additive manufacturing are provided in the manufacturing chamber 2. After closing the door 4 the vacuum pump 8 is started and the valve 10 is opened. This evacuates the manufacturing chamber 2 via the evacuation conduit 9. Once evacuation is complete the vacuum pump 8 is switched off and the valve 10 closed. Opening the valve 13 then causes pure protective gas to flow out of the pressure vessel 7 via the gas return conduit 12 into the manufacturing chamber 2 and form a protective gas atmosphere therein. Valve 13 is then closed. This is followed by performing the additive manufacturing of the workpiece 3 in the manufacturing chamber 2.

After manufacturing the workpiece 3, the vacuum pump 8 is restarted and the valve 11 is opened. This causes the protective gas atmosphere from the manufacturing chamber 2 to be at least very largely pumped into the pressure vessel 7. For pre-purification of the protective gas the gas withdrawal conduit 6 has arranged in it, downstream of the evacuation conduit 9, a filter unit 19, by means of which the particulate impurities, for example soot and char particles, are removed from the gas stream passed through the gas withdrawal conduit 6.

After evacuation of the manufacturing chamber 2, the valve 11 is closed, the vacuum pump 8 is switched off and the valve 14 in the purge gas feed conduit 15 is opened. This has the result that a purge gas, for example air from the ambient atmosphere, flows into the manufacturing chamber 2. After production of pressure equalization with the environment, the door 4 is opened and the workpiece 3 removed. The manufacturing chamber 2 is then prepared for production of a further workpiece. After closing the door 4 and the valve 14 and re-evacuation of the manufacturing chamber 2 via the evacuation conduit 9 using the vacuum pump 8 the manufacturing chamber 2 is refilled with protective gas. To this end the valve 13 is opened, thus causing protective gas to flow from the pressure vessel 7 via the gas return conduit 12 into the evacuated manufacturing chamber 2, thus rapidly forming a protective gas atmosphere. To achieve the highest possible purity of the reused protective gas, in particular for removal of oxygen, steam or other gaseous impurities, the gas return conduit 12 has an apparatus 20 for gas purification arranged in it. This is for example an apparatus which effects absorptive separation of the oxygen present in the gas stream.

Since during ongoing operation a certain proportion of protective gas is lost, for example during removal of the workpiece 3 from the manufacturing chamber 2 and/or the protective gas becomes excessively contaminated, it is necessary to supplement or replace the protective gas present in the pressure vessel 7 from time to time. This is done by introduction of protective gas from the source 18.

It is further also conceivable for the protective gas to be recirculated during the manufacturing process, wherein protective gas is continuously blown onto the workpiece 3 and simultaneously a corresponding amount of protective gas is withdrawn from the manufacturing chamber 2. This may employ for example a separate gas flow means not shown here, such as is described for example in WO 2019/001900 A1. In this case too, the manufacturing chamber 2 is filled with protective gas after termination of the manufacture of the workpiece 3. However, in the exemplary embodiment shown here such a gas flow means may also be realized when, during the manufacturing process valves 11 and 13 remain open and the protective gas is continually recirculated using the vacuum pump 8, thus causing it to be purified in the filter unit 19 and the apparatus 20.

The apparatus 1 achieves recirculation of the protective gas which in the case of sequential manufacturing of workpieces 3 allows repeated use of the protective gas in the manufacturing chamber 2, especially in consecutive manufacturing operations.

LIST OF REFERENCE NUMERALS

1 Apparatus
2 Manufacturing chamber
3 Part
4 Door
5 Manufacturing platform
6 Gas withdrawal conduit
7 Pressure vessel
8 Vacuum pump
9 Evacuation conduit
10 Valve
11 Valve
12 Gas return conduit
13 Valve
14 Valve
15 Purge gas conduit
16 Valve
17 Gas feed conduit
18 Source (for protective gas)
19 Filter unit
20 Apparatus for gas purification

The invention claimed is:

1. An apparatus for additive manufacturing of workpieces under protective gas which is provided with a manufacturing chamber in which a workpiece is producible under protective gas by selective sintering or melting of a pulverulent starting material through introduction of energy, wherein the manufacturing chamber is in the form of a pressure chamber and is fluidically connected to a pressure vessel via a gas withdrawal conduit fitted with a vacuum pump and via a gas return conduit;

wherein a first valve is provided in the gas withdrawal conduit between the manufacturing chamber and the pressure vessel, the first valve being configured to selectively permit flow of the protective gas from the manufacturing chamber into the pressure vessel;

wherein a second valve is provided in the gas return conduit between the pressure vessel and the manufacturing chamber, the second valve being configured to selectively permit flow of the protective gas from the pressure vessel into the manufacturing chamber; and wherein the pressure vessel is configured to store the protective gas at a pressure between 2 and 5 bar (g), which pressure is a result of the vacuum pump pumping the protective gas into the pressure vessel via the gas withdrawal conduit.

2. The apparatus as claimed in claim 1, wherein the manufacturing chamber is provided with a feed conduit for a purge gas, and wherein an evacuation conduit for evacuating residual atmosphere from the manufacturing chamber branches off from the gas withdrawal conduit downstream of the vacuum pump.

3. The apparatus as claimed in claim 1, wherein a filter apparatus is arranged in the gas withdrawal conduit and/or the gas return conduit.

4. The apparatus as claimed in claim 1, wherein an apparatus for gas aftertreatment is arranged in the gas return conduit and/or the gas withdrawal conduit.

5. The apparatus as claimed in claim 1, wherein the manufacturing chamber is provided with a gas flow means for passing a protective gas stream through the manufacturing chamber.

6. The apparatus as claimed in claim 1, wherein the pressure vessel is fluidically connected to a source of a protective gas.

7. A process for additive manufacturing of workpieces under protective gas where protective gas is supplied to a manufacturing chamber and a workpiece is produced in the manufacturing chamber by selective sintering or melting of a pulverulent starting material through introduction of energy, wherein after production of a first workpiece, the process comprises the following steps:

(a) the protective gas present in the manufacturing chamber is evacuated using a vacuum pump and intermediately stored in a pressure vessel, the pressure vessel being configured to store the protective gas at a pressure between 2 and 5 bar (g), which pressure is a result of the vacuum pump pumping the protective gas into the pressure vessel, (b) the manufacturing chamber is flooded with a purge gas and the first workpiece is removed, and (c) before commencement of manufacturing of a second workpiece, the purge gas present in the manufacturing chamber is at least largely evacuated using the vacuum pump and the manufacturing chamber is subsequently flooded with the protective gas from the pressure vessel that was stored during step (a).

8. The process as claimed in claim 7, wherein the pressure in the manufacturing chamber is brought to a value of below 10 hPa during evacuation of the protective gas in step (a) and/or during evacuation of the purge gas in step (c).

9. The process as claimed in claim 7, wherein the protective gas is subjected to a purification stage during removal from the manufacturing chamber in step (a) and/or during supply to the manufacturing chamber in step (c).

10. The process as claimed in claim 7, wherein the pressure in the manufacturing chamber is brought to a value of below 1 hPa during evacuation of the protective gas in step (a) and/or during evacuation of the purge gas in step (c).

11. The process as claimed in claim 7, wherein step (a) comprises opening a first valve located in a gas withdrawal conduit between the manufacturing chamber and the pressure vessel and closing a second valve located in a gas return conduit between the pressure vessel and the manufacturing chamber.

12. The process as claimed in claim 11, wherein step (b) comprises closing the first valve in the gas withdrawal conduit and opening a third valve in a purge gas feed conduit connected to the manufacturing chamber.

13. The process as claimed in claim 11, wherein step (c) comprises closing the first valve located in the gas withdrawal conduit and opening the second valve located in the gas return conduit so as to flood the manufacturing chamber with the stored protective gas.

14. The apparatus as claimed in claim 6, wherein the source of protective gas is connected to the pressure vessel via a gas feed conduit and to the manufacturing chamber via the gas return conduit.

* * * * *